United States Patent [19]

Bachtel et al.

[11] Patent Number: 5,527,512
[45] Date of Patent: Jun. 18, 1996

[54] APPARATUS FOR CATALYST REPLACEMENT

[75] Inventors: Robert W. Bachtel, El Cerrito, Calif.; Yoshitomo Ohara; Toshio Ishizuka, both of Tokyo, Japan; Tsunehiko Hiraga, Hokkaido, Japan

[73] Assignee: Chevron U.S.A. Inc., San Francisco, Calif.

[21] Appl. No.: 261,594

[22] Filed: Jun. 17, 1994

[30] Foreign Application Priority Data

Jul. 18, 1993 [JP] Japan ................... 5-172510

[51] Int. Cl.$^6$ ............................................. B01J 8/00
[52] U.S. Cl. .................. 422/143; 422/220; 422/311
[58] Field of Search ......................... 422/143, 145, 422/176, 220, 238, 311

[56] References Cited

U.S. PATENT DOCUMENTS

| | | | |
|---|---|---|---|
| 3,829,983 | 8/1974 | White ................................. | 422/143 X |
| 3,910,769 | 10/1975 | Mayer et al. ....................... | 422/142 |
| 4,312,741 | 1/1982 | Jacquin .............................. | 208/11 |
| 4,392,943 | 7/1983 | Euzen et al. ....................... | 208/152 |
| 4,444,653 | 4/1984 | Euzen et al. ....................... | 208/152 |
| 4,571,326 | 2/1986 | Bischoff et al. ................... | 422/207 |
| 4,590,045 | 5/1986 | van der Wal et al. ............. | 422/216 |
| 4,591,428 | 5/1986 | Pronk ................................. | 208/165 |
| 4,639,354 | 1/1987 | Bischoff et al. ................... | 422/140 |
| 4,879,958 | 11/1989 | Allen et al. ........................ | 422/143 X |
| 4,968,409 | 11/1990 | Smith ................................. | 208/157 |
| 5,076,908 | 12/1991 | Stangeland et al. ............... | 208/148 |
| 5,098,230 | 3/1992 | Scheuerman ....................... | 406/143 |
| 5,302,357 | 4/1994 | Kramer et al. ..................... | 422/219 |

FOREIGN PATENT DOCUMENTS

WO91/01359  7/1991  WIPO.

*Primary Examiner*—Robert J. Warden
*Assistant Examiner*—Robert Carpenter
*Attorney, Agent, or Firm*—A. W. Klaassen; J. J. DeYoung; J. W. Carpenter

[57] ABSTRACT

A light-weight and easily manufacturable catalyst support structure is provided, which allows fluid flow into a catalyst bed in uniform distribution. The support structure, used for supporting a moving catalyst bed within a moving bed reactor having an upward flowing fluid phase, is formed in a cone-like shape in which the diameter enlarges upward. The supporting structure comprises a shell-like support member, a first mesh layer comprising thick mesh elements, and a second mesh layer having a mesh size which does not allow catalyst particles to pass through. The first mesh layer overlays the support member, and the second mesh layer overlays the first mesh layer. The shell-like support member includes a circular bottom plate extending perpendicular to the center line of the reactor, and a side wall having a truncated cone shape which extends upward from the edge of the bottom plate. The bottom plate and the side wall are primarily made of perforated plates through which the fluid passes. A plurality of cylindrical flow guides of different diameters are provided underneath the shell-like support member.

5 Claims, 5 Drawing Sheets

APPARATUS FOR CATALYST REPLACEMENT

Priority is claimed for this application under 35 U.S.C. §119 based upon Japanese patent application 5-172510 filed Jun. 18, 1993.

FIELD OF THE INVENTION

The present invention relates to a supporting structure for a catalyst bed, the structure having a cone-like shape with a diameter enlarging upward, which is used for supporting a moving catalyst bed within a moving bed reactor in which fluid flows upward.

More specifically, it relates to a supporting structure which provides a uniform distribution of fluid into a catalyst bed at reduced weight and at lower cost.

BACKGROUND OF THE INVENTION

The moving bed reactor referred in this specification is described in International Patent Publication No. WO91/01359. In the reactor, catalyst is charged into the upper portion of the reactor and is drawn off from the lower portion of the reactor, when necessary, even during reactor operation. It may be used in many kinds of liquid-gas reaction processes, for example in hydrodesulfurization of atmospheric distillation residuum from crude oil or vacuum distillation residuum from topped crude oil.

In the moving bed reactor, as shown in the FIG. 4, a two phase fluid consisting of a reactant gas (for example, a hydrogen containing gas) and a liquid reactant enters into the bottom of reactor A, and flowing upward through a catalyst bed B, exits from the top. Wherever necessary, the catalyst is charged into the reactor A through a catalyst charge pipe C provided in the upper portion and is drawn off through draw-off pipe D located above a supporting structure for the catalyst bed.

In the above-mentioned construction, fresh catalyst charged into the upper portion through the catalyst charge pipe C flows downward while catalyzing the desired process reactions, loses catalyst activity, and finally is drawn off as spent catalyst through draw-off pipe D. The catalyst bed B is maintained at a high catalyst activity by charging fresh catalyst to the catalyst bed at a rate which balances the removal rate of spent catalyst having reduced catalyst activity, so that the desired process reactions can proceed effectively even in a small reactor.

Embodiments of a beam supporting structure are shown in FIG. 5, 6, and 7. FIG. 5 is a plan drawing showing the supporting structure for a moving catalyst bed (hereinafter referred to as the supporting structure). FIG. 6 is a sectional drawing showing the section of the supporting structure in line Y—Y of FIG. 5, and FIG. 7 is a enlarged drawing showing the section of the supporting structure in line Z—Z of FIG. 5.

Supporting structure 1 is constructed of a framework assembly formed by radial beams 3 and transverse members 4 between beams 3, and wire mesh layers 5, 6 overlaying the framework, as shown in FIG. 5. As shown in FIG. 5, FIG. 6 and FIG. 7, the framework consists of 8 beams 3 of a high beam height extending radially like spokes towards the upper portion of the reactor from an octagonal center plate 2, and having transverse members 4 between beams 3 to form similar but different sized octagons.

Spacecloth layer 5 and wire mesh layer 6 overlay the assembly. The spacecloth 5 is a woven wire mesh of thick wires, and the wire mesh 6 is of a smaller mesh size than the particle size of the catalyst particles.

The inlet of draw-off pipe D is set above the center plate 2, as shown in FIG. 4. The center plate 2 and beams 3 are interconnected with each other by adequately sized connecting members, for example octagonal connecting member 7, as shown FIG. 6. The supporting structure 10 is connected to the reactor A by the reinforcing ring 8.

As mentioned above, the supporting structure, which comprises a grid-like framework of beams and plate members and wire mesh layers overlaid on the grid-like framework, has been developed for moving catalyst bed reactors in accordance with the same technical concept as the grid-like supporting structures used for conventional fixed catalyst beds.

However, when, for example, economic factors require an increase in throughput, reactors having a large diameter are required to meet the throughput requirements. As the diameter of the reactor and the volume of catalyst charged to the reactor increases, the size of individual structural members in the supporting structure, and especially the size of the beams, have to be increased to support the weight load of the increased catalyst volume. As the size of individual structural members, and especially the size of the beams, increases, they tend to prevent the fluid from being uniformly distributed into the catalyst bed. As a result, contact between the fluid and the catalyst becomes uneven and variable from region to region in the reactor.

In the beam supporting structures, when a prefabricated polygonal supporting structure is installed into a cylindrical reactor, its individual members have to be modified mechanically to fit the shape of the reactor. However, it is technically very difficult, and requires a lot of manpower and time, to make such mechanical modifications in the field, and installation costs are high.

As mentioned above, a supporting structure having large support members experience problems with uneven distribution of fluid, and require high fabrication and installation costs. Thus, it is expected in the chemical or petroleum industries to provide an improved supporting structure appropriate to a large reactor.

In this connection, the purpose of the present invention is to provide an easily manufacturable and light-weight supporting structure suitable for supporting a moving catalyst bed in a large reactor, while introducing fluid into the catalyst bed in a uniform distribution.

We have found that the increase in weight of the beam supporting structure is caused mainly by the construction of the grid-like framework consisting of beams and plate members. The grid-like framework is designed considering the load of the catalyst bed as a bending stress. These members are required to have a section modulus comparable to the bending stress.

As a result of study and experiments, the inventors have completed the present invention by adopting a shell-like structure to be designed considering the load of the catalyst bed as a membrane stress rather than a bending stress.

SUMMARY OF THE INVENTION

To achieve the stated objectives, the present invention provides a supporting structure forming a cone-like shape, and having a diameter enlarging upward, for supporting a moving catalyst bed within a moving bed reactor having an upward flowing fluid phase, said supporting structure comprising a shell-like support member; a first mesh layer comprising thick mesh elements and laid on said shell-like support member; and a second mesh layer laid on said first mesh layer and having a mesh size such that catalyst particles do not pass through said second mesh layer; wherein said shell-like support member comprises a circular bottom plate positioned perpendicular to the center line of the reactor, and a truncated cone-like side wall extending upward from the edge of said circular bottom plate; and wherein said side wall and bottom plate are substantially made of plate members provided with many holes.

It is preferable that the angle (the angle α indicated in the FIG. 1) between the generating line of the truncated-cone and the diameter of the moving bed reactor (hereinafter, called the reactor) is larger than the angle of repose of catalyst particles, to facilitate the flow of catalyst.

The thickness of the plate member forming the side wall can be calculated in accordance with known membrane stress calculation formulas, based on the catalyst weight load to be supported. The diameter, the pitch, and the number of the holes are determined based on the allowable pressure drop for the reacting gas and the reacting liquid flowing through the supporting structure, particle sizes of the catalyst, and the weight of the catalyst bed. The materials of the plate members are determined by considering corrosion caused by reacting gas and reacting liquid, reaction temperature, etc.

It is preferred that the opening areas of the first wire mesh layer overlaying the holes of the plate members be larger than the opening area of each hole, and that the diameter of the wire elements is thick enough to support the catalyst weight over each of the holes.

The second wire mesh layer is provided to prevent catalyst particles from dropping downward though the supporting structure, and the first wire mesh layer is provided to reinforce the second wire mesh layer and to support the catalyst weight over the opening area of each hole. The wire mesh elements for the first and second wire mesh layers are not necessarily of metal wire netting, but may be replaced by any material performing the same function as wire netting, for example perforated plates.

In the preferred embodiment, a supporting structure for a catalyst bed is characterized by a plurality of cylindrical flow guides of different diameters, concentrically positioned underneath the shell-like support member.

Since the supporting structure for a catalyst bed is formed by plate members to support the load of the catalyst in the present invention, the weight of the supporting structure can be reduced to a great extent compared with a beam supporting structure. Furthermore, since easily fabricatable plate members are used as the support members, it is very easy to form a truncated-cone and to connect it to a reactor body in the field. Since holes are provided in the plate members in uniform distribution, the supporting structure according to the present invention can introduce fluid into the catalyst bed in a more uniform distribution over the whole sectional area of the catalyst bed compared with using beam supporting structures. Consequently, efficiency of the reaction process becomes higher due to uniform contact between the fluid and the catalyst. Thus, the present invention has the process advantage that the fluid can be introduced into the catalyst bed in uniform distribution and with small pressure drop, and the economical advantages that the weight of the supporting structure can be reduced, the fabrication made easier, and costs reduced. Furthermore, since diameters and pitches of holes may be adjusted according to the specific location, of each hole, the distribution pattern of the fluid flow can be adjusted easily.

In a preferred embodiment, since a plurality of cylindrical flow guides of different diameters are provided underneath the shell-like supporting member, fluid coming from the lower portion of the reactor can be introduced uniformly into the catalyst bed. In the absence of flow guides, the fluid flows outwardly along the conical surface of the shell-like support member of the supporting structure to be deflected at high velocity along the reactor walls. Since the supporting structure according to the present invention has the shell-like support member formed by plate members, it can be provided with flow guides at optimum locations chosen to give a uniform flow distribution, while avoiding holes in the shell-like support member. Consequently, a distribution pattern of fluid entering into the catalyst bed can be easily adjusted by proper positioning of the flow guides.

DETAILED DESCRIPTION OF THE INVENTION

The present invention will be explained in detail below based on the preferable embodiment, referring to the attached drawings.

Figure 1:
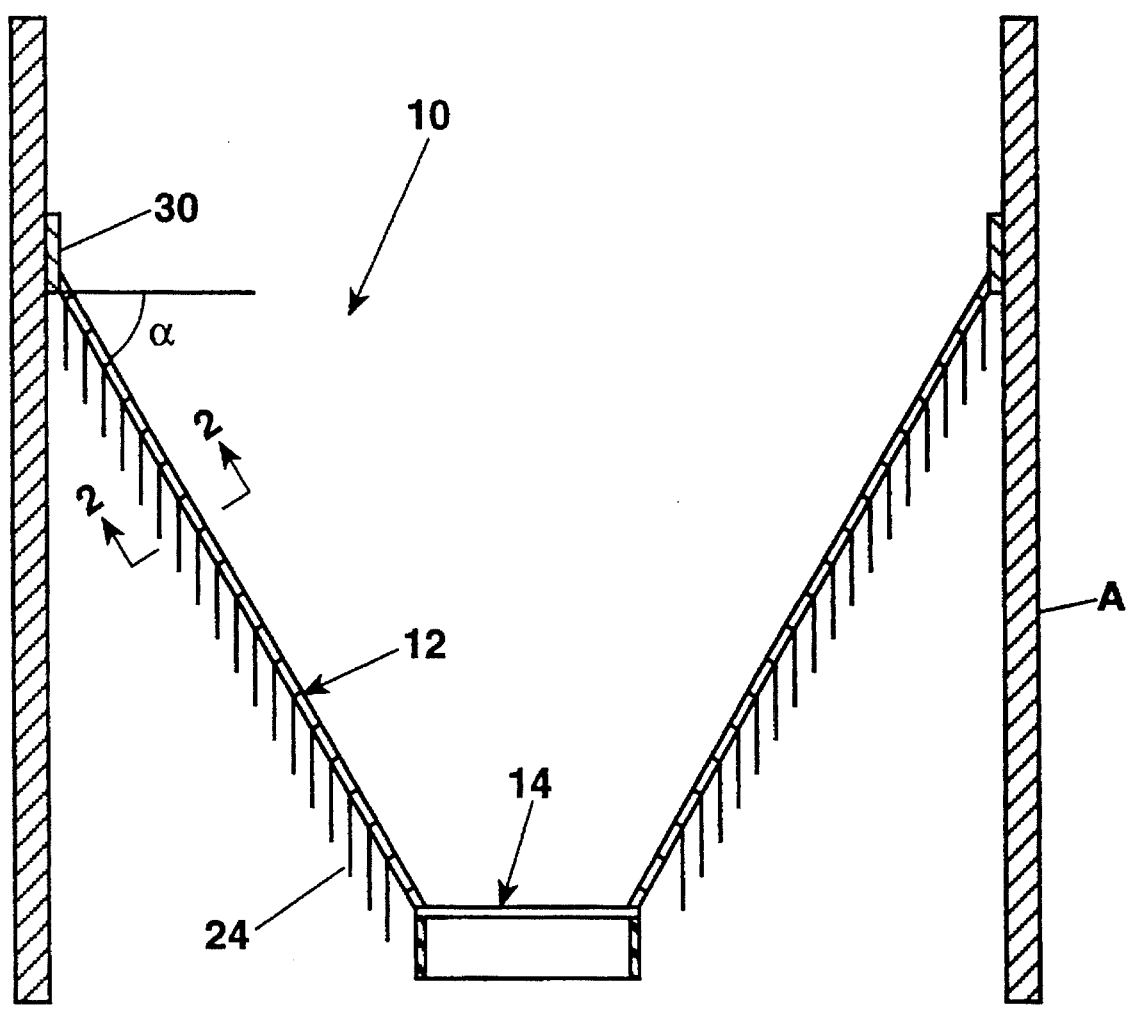
FIG. 1 is a sectional drawing showing the supporting structure in a plane containing the centerline of the reactor A.
Figure 2:
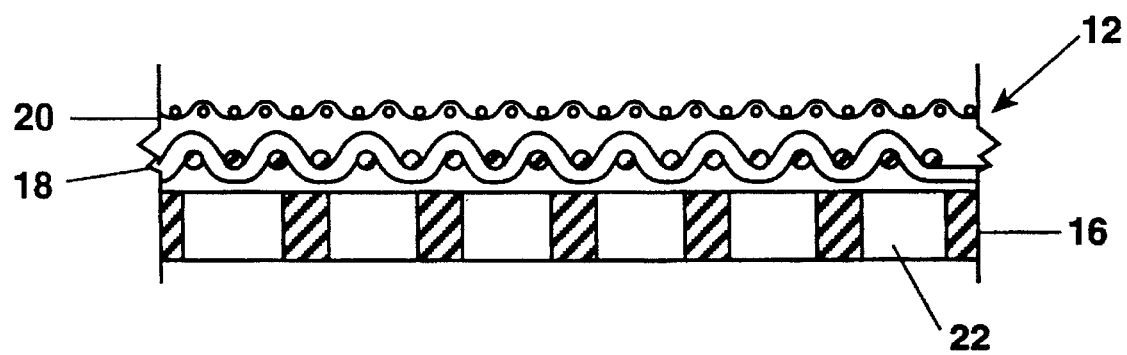
FIG. 2 is a sectional drawing of the supporting structure in line X—X of FIG. 1.

FIG. 1 is a sectional drawing showing the supporting structure for a catalyst bed (hereinafter referred to as a supporting structure) in a plane containing the centerline of reactor A, and FIG. 2 is a sectional drawing of the supporting structure in line X—X of FIG. 1.

Figure 4:
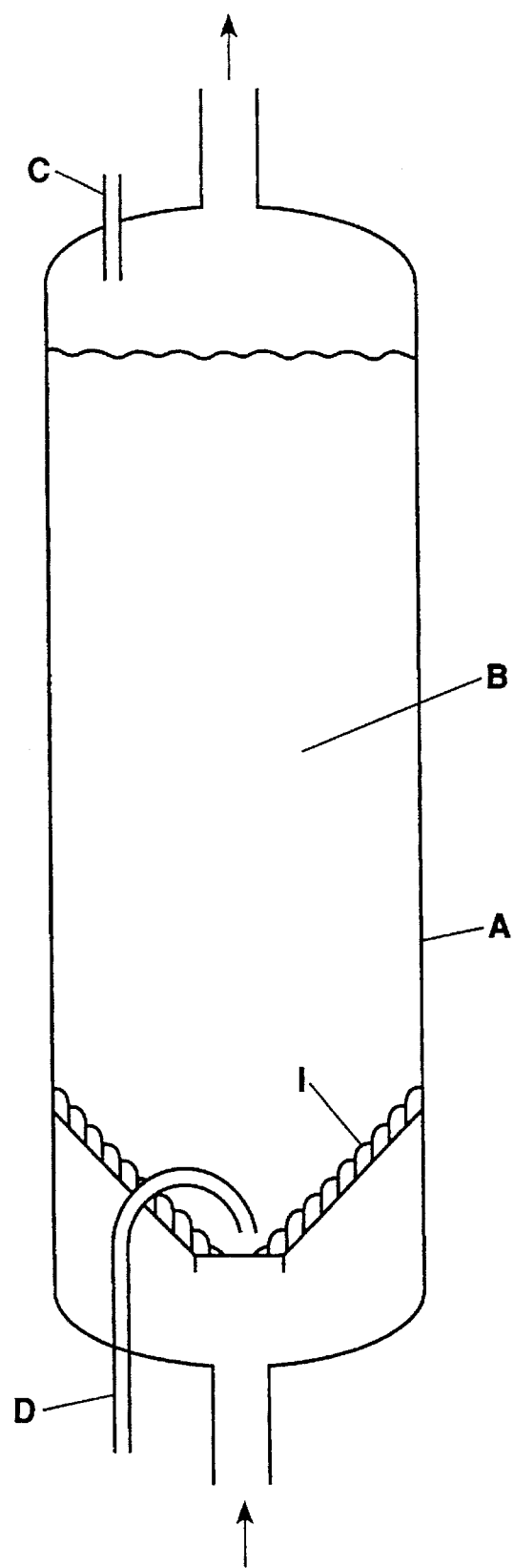
FIG. 4 is a diagramatic sectional drawing showing the moving catalyst bed reactor.
Figure 5:
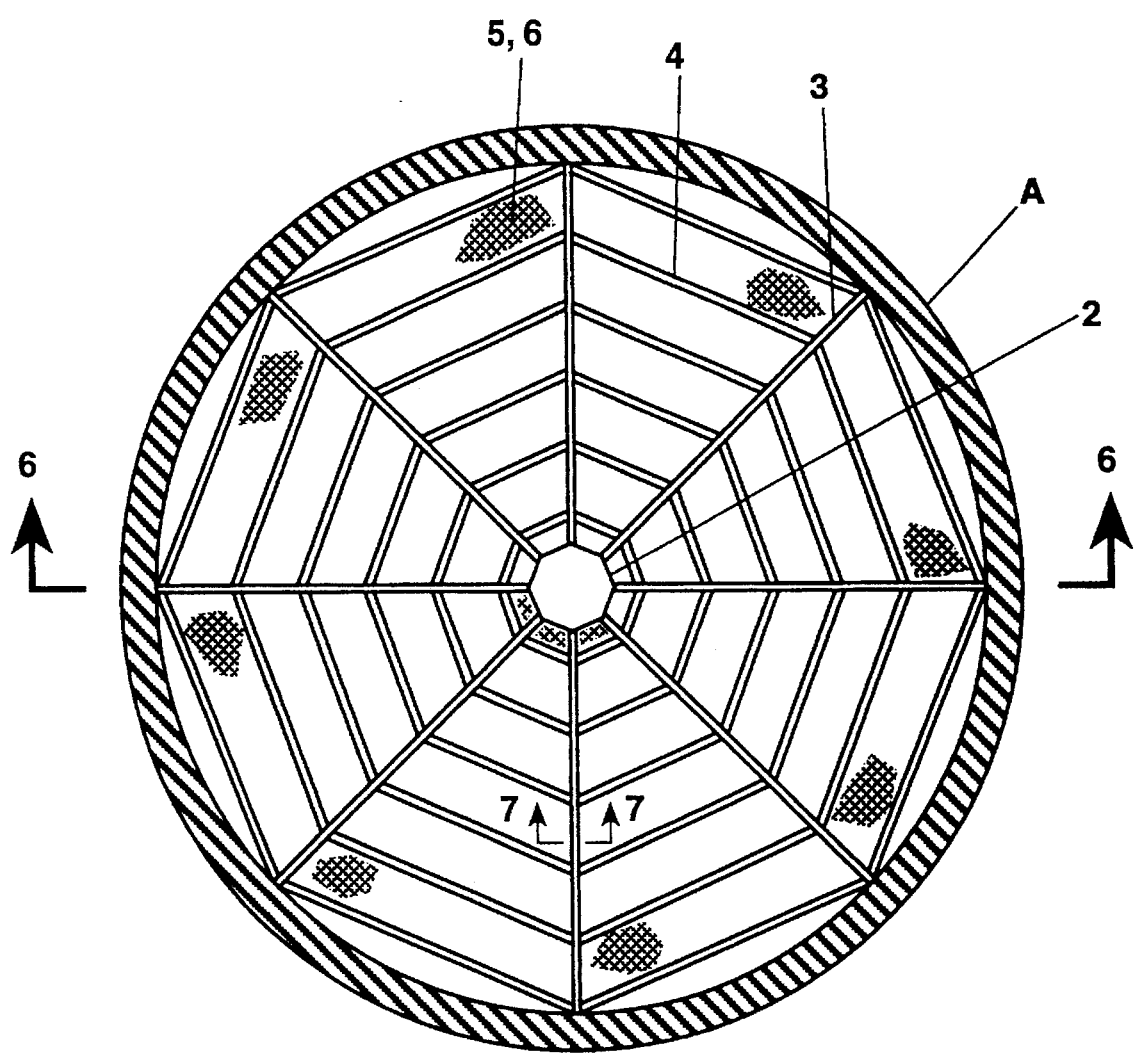
FIG. 5 is a plan drawing showing a beam supporting structure for a moving catalyst bed.
Figure 6:
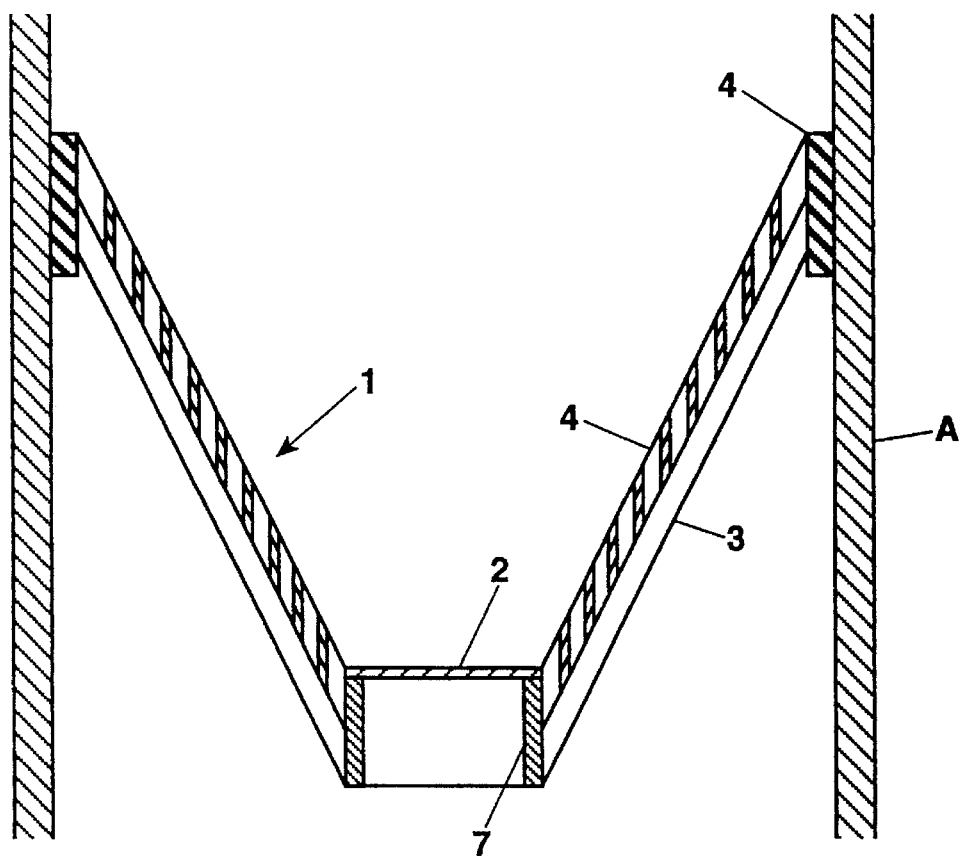
FIG. 6 is a sectional drawing showing the section of the supporting structure in line Y—Y of FIG. 5.
Figure 7:
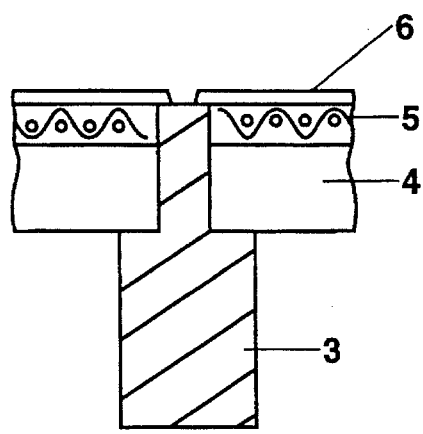
FIG. 7 is an enlarged drawing showing the supporting structure in line Z—Z of FIG. 5.

The supporting structure 10 shown in FIG. 1 has been installed in moving catalyst bed reactor A (hereinafter referred to as reactor A) shown in FIG. 4, where fluid flows upwards from the bottom to the top. The supporting structure 10 is positioned such that the centerline of the supporting structure 10 is consistent with the centerline of reactor A. The supporting structure 10 comprises a truncated cone-like side wall 12, having a diameter which enlarges towards the top of the reactor A, and a bottom plate 14 located in the center of side wall 12, namely, the lowest position of the supporting structure 10, and extending perpendicular to the centerline of the reactor A.

Side wall 12 is shaped as a truncated cone such that angle α indicated in FIG. 1 is larger than the angle of repose of catalyst particles. Bottom plate 14, having a nearly circular shape, is connected to the edges of the lower portion of side wall 12. A catalyst draw-off pipe D, indicated in FIG. 4, is provided such that its inlet is located adjacent to and above the bottom plate 14 to facilitate catalyst draw-off from the supporting structure 10.

As shown in FIG. 2, the side wall 12 and the bottom plate 14 both have, as a bottom layer, a perforated plate 16 made of plate members to form the shell-like support member. A first wire mesh layer 18 overlays the perforated plate 16 as a lower layer, and a second wire mesh layer 20 overlays the first wire mesh layer 18.

The thickness of the perforated plate 16 can be calculated in accordance with known membrane stress calculation formulas, based on the catalyst weight load to be supported. Many holes 22 are provided nearly in equal pitches to penetrate the perforated plate 16 so that the fluid can be introduced into the catalyst bed. The total opening area of the holes 22 is determined based on the allowable pressure drop for reacting gas and reacting liquid entering the catalyst bed. The side wall 12 and the bottom plate 14 may not necessarily have holes 22 of the same pitch and of the same diameter. For example, holes 22 may be provided in different diameters and different pitches depending on location on the support structure.

The first wire mesh layer 18 is made of wire netting with a comparatively large mesh size woven using thick metal wires. The second wire mesh layer 20 is made of wire-netting with a slightly smaller mesh size than the particle size of the catalyst. The second wire mesh layer 20 is provided to prevent catalyst particles from dropping downward through the supporting structure 10, and the first wire mesh layer 18 is provided to reinforce the strength of the second wire mesh layer 20 and to support the catalyst weight over the opening area of each hole 22.

Figure 3:
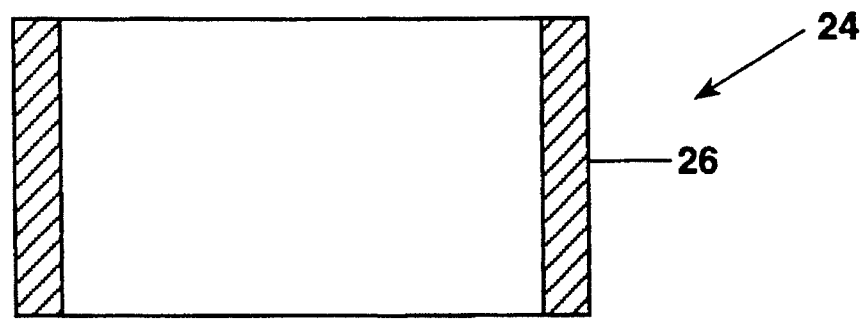
FIG. 3 is a sectional drawing enlarging the section of the flow guide.

Many cylindrical flow guides 24 of different diameters are concentrically installed underneath the perforated plate 16 to have their centers on the centerline of the side wall 12. The flow guides 24 are made of cylindrical members 26, as shown in FIG. 3.

As per the above-mentioned construction, the flow guides 24 can introduce the fluid coming from the bottom of reactor A into the catalyst bed in uniform distribution through the supporting structure 10. The supporting structure 10 is connected with the body of reactor A by the reinforcing ring 30.

EXAMPLE

The following is a design example of the supporting structure according to the present invention:
Inside diameter of reactor:4,400 mm
Weight of catalyst in reactor:220 metric ton
Angle α:60°
Diameter of bottom plate:1,066 mm
Thickness of perforated plate:22 mm in lower portion of side wall :28 mm in upper portion of side wall
Diameter X Pitch of hole:50 mm×75 mm
First wire mesh layer:metal wire netting having diameter 6 mm, pitch 10 mm
Second wire mesh layer:metal wire netting having diameter 1.6 mm, 9×9 mesh
Total weight of supporting:approximately 11 ton structure
Dimensions of a beam supporting structure designed based on the same design conditions as the above design example are as follows:
Beams:8 solid pieces of 330 mm high, and 150 mm wide
Transverse member traversing:a number of plate members beams of 300 mm high, and 38 mm thick
Total weight of supporting:approximately 32 ton structure Comparing the two cases above, while the beam supporting structure has the problem in that it prevents fluid from entering into a catalyst bed in uniform distribution due to the wide beams, which cause an uneven and non-uniform flow of the fluid, the design example does not cause such uneven and non-uniform flow, because of a uniform distribution of the holes. While the pressure drop of the fluid through the supporting structure becomes great in the beam structure case, in which the flow area of the fluid is reduced due to the wide beams, the pressure drop will not be so great in the design example, where holes with required diameters can be arranged as necessary. Furthermore, power consumption for operating the reactor will be reduced.

The design example can reduce the weight of the required materials to approximately 35% of the beam structure and thus can reduce the material costs. Since the thickness of the skirt supporting the reactor body can be reduced due to the weight reduction of the supporting structure, the material cost will be further reduced. Further, since the construction of the design example is very simple, compared to the beam structure, the manpower required for fabrication and installation can be reduced by approximately 30%.

What is claimed is:

1. A supporting structure within a reactor having a downward flowing moving catalyst bed of catalyst particles and an upward flowing fluid phase, said supporting structure having a conical shape, and having a diameter enlarging upward, for supporting the moving catalyst bed, said supporting structure comprising:

(a) a support member;

(b) a first mesh layer laid on said support member;

(c) a second mesh layer laid on said first mesh layer and having a mesh size such that the catalyst particles do not pass through said second mesh layer; and (d) a plurality of cylindrical flow guides of different diameters concentrically positioned underneath and abutting said support member, wherein said support member comprises a circular bottom plate positioned perpendicular to a center line of the reactor, and a truncated cone-shaped side wall extending upward from the edge of said circular bottom plate such that the angle between the side wall and the horizontal is greater than the angle of repose of the catalyst particles;

and wherein said side wall and bottom plate are substantially made of plate members provided with many circular holes.

2. A supporting structure for supporting a moving catalyst bed within a reactor having a downward flowing moving catalyst bed of catalyst particles and an upward flowing fluid phase, said supporting structure having a conical shape, and having a diameter enlarging upward, said supporting structure comprising:

(a) a support member comprising a circular bottom plate and a truncated cone-shaped side wall extending upward from the edge of said circular bottom plate such that the angle between the side wall and the horizontal is greater than the angle of repose of the catalyst particles, the side wall being made of a plate member provided with many holes;

(b) a first mesh layer laid on said support member;

(c) a second mesh layer laid on said first mesh layer and having a mesh size such that the catalyst particles do not pass thorough said second mesh layer; and (d) a plurality of cylindrical flow guides of different diameters concentrically positioned underneath and abutting said support member.

3. The supporting structure as defined in claim 2 wherein the angle between the side wall and the horizontal is 60°.

4. The supporting structure as defined in claim 3, wherein a plurality of cylindrical flow guides of different diameters are concentrically positioned underneath and abutting said support member.

5. The supporting structure as defined in claim 2, wherein the first mesh layer has openings larger than the opening of the holes in the side wall.

* * * * *